United States Patent
Kahn (10) Patent No.: US 8,465,078 B2
(45) Date of Patent: Jun. 18, 2013

(54) METHOD OF DESIGNING A DRIVER'S COMPARTMENT

(75) Inventor: Nir Kahn, Nahariya (IL)

(73) Assignee: Plasan Sasa Ltd., M.P. Marom Hagalil (IL)

( * ) Notice: Subject to any disclaimer, the term of this patent is extended or adjusted under 35 U.S.C. 154(b) by 0 days.

(21) Appl. No.: 13/191,266

(22) Filed: Jul. 26, 2011

(65) Prior Publication Data
US 2012/0043780 A1   Feb. 23, 2012

(30) Foreign Application Priority Data
Jul. 26, 2010 (IL) .......................................... 207239

(51) Int. Cl.
*B60N 2/02* (2006.01)
(52) U.S. Cl.
USPC ........................................................... 296/64
(58) Field of Classification Search
USPC ................................................ 296/64, 65.01
See application file for complete search history.

(56) References Cited

U.S. PATENT DOCUMENTS

| | | | |
|---|---|---|---|
| 118,775 A | 9/1871 | Page | |
| 2,088,784 A | 8/1937 | Galamb et al. | |
| 2,133,325 A | 10/1938 | Jacobs | |
| 2,256,009 A | 9/1941 | Atwood | |
| 2,391,872 A | 1/1946 | Berg | |
| 3,194,531 A * | 7/1965 | Langer | 248/421 |
| 3,314,672 A * | 4/1967 | Persson | 267/131 |
| 3,608,855 A * | 9/1971 | Osenberg | 248/567 |
| 3,635,524 A * | 1/1972 | Faust | 297/284.11 |
| 3,806,075 A | 4/1974 | Sturhan | |
| 5,441,331 A | 8/1995 | Vento | |
| 6,805,033 B2 | 10/2004 | Mauthe et al. | |
| 7,770,506 B2 * | 8/2010 | Johnson et al. | 89/36.09 |
| 2003/0051598 A1 | 3/2003 | Mauthe et al. | |
| 2008/0211283 A1 | 9/2008 | Okano et al. | |
| 2011/0068608 A1 | 3/2011 | Ohtsubo et al. | |

FOREIGN PATENT DOCUMENTS

EP   2174828   4/2010

OTHER PUBLICATIONS

EP 11 17 5447, European Search Report, Nov. 15, 2011 (2pgs).

* cited by examiner

*Primary Examiner* — H Gutman
(74) *Attorney, Agent, or Firm* — Workman Nydegger (57) ABSTRACT

A method of designing a driver's compartment for accommodating different driver's sizes, the compartment having a floor and a top end. The method includes: designing a driver's seat having a seat reference point (SRP) designating the position of a seat rear part and a seat pan height reference point (SPHRP) defining the position of the front portion of the seat. A seat moving mechanism moves the SRP vertically between a smallest position, where the SRP is at a vertical height H1 from the top end, and a largest position where the SRP is at a vertical height H2 from the top end, where H2 is greater than H1. The vertical height H3 of the SPHRP from the floor is maintained and constant. Front portion of the seat remains fixed. The top end is disposed at a vertical distance H4 from the floor, where H4 is the sum H1 and H3.

19 Claims, 6 Drawing Sheets

METHOD OF DESIGNING A DRIVER'S COMPARTMENT

CROSS-REFERENCE TO RELATED APPLICATIONS

This application claims priority to Israel Patent Application No. 207239 filed on 26 Jul. 2010, the contents of which are incorporated herein, in their entirety, by this reference.

TECHNICAL FIELD

The subject matter of the present application relates to a method of designing a driver's compartment for accommodating a predetermined range of driver's sizes comprising a smallest size and a largest size, and a movable driver's seat for the driver's compartment.

BACKGROUND

Economic and regulatory considerations cause designers to design driver's compartments of vehicles to accommodate drivers of a range of different sizes. This includes sizing a multitude of features of a vehicle's driver's compartment to suit both an upper end and lower end of the range.

Figure 1:
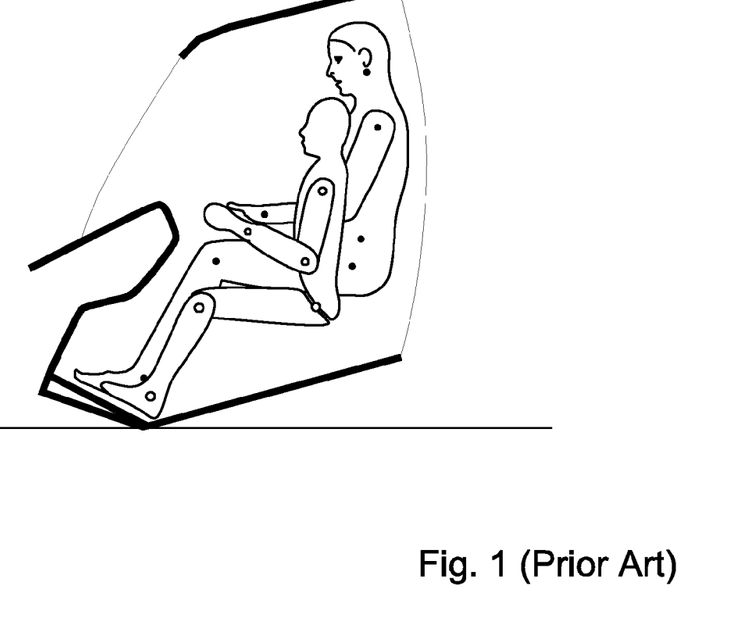
FIG. 1 is a schematic side view of a design of a known truck driver's compartment.
Figure 2:
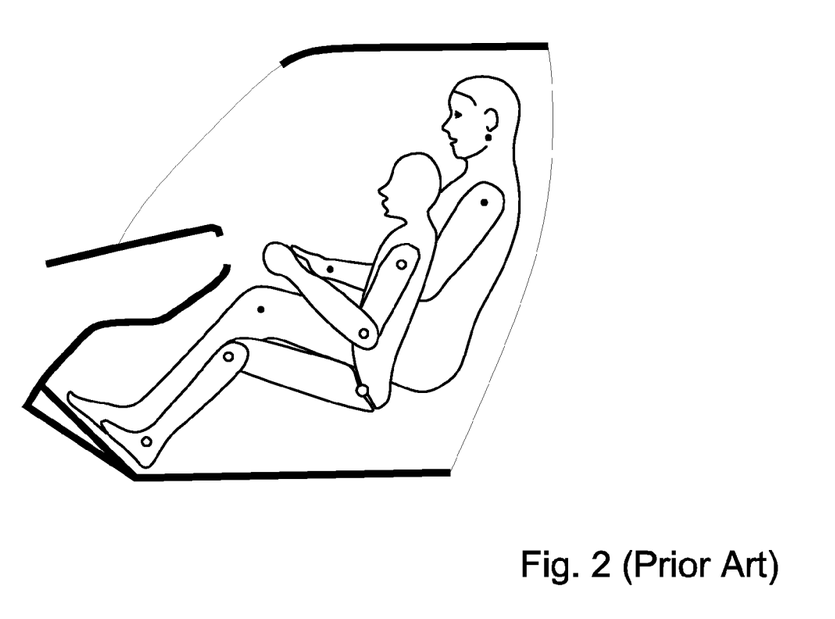
FIG. 2 is a schematic side view of a design of a known car driver's compartment.

An appreciation of the complexity of the features involved in merely positioning a driver in a driver's compartment can be received by review of known conventional driver's compartment designs shown in FIGS. 1 and 2. This design takes into consideration vertical and or horizontal distances of different body parts of the driver form various elements in the driver's compartment, for example, the distance between the head and the front window, the distance between the knees and the floor, etc.

Consequent to the need to suit a driver's compartment to drivers of different sizes, the size of a driver's compartment can be significantly larger than would be the case for a driver's compartment which is designed for only a driver of a single size.

SUMMARY

Throughout the present application, reference will be made to a driver's seat.

For the purposes of the specification and the claims, the term "driver's seat" includes the following features, described with reference to a seat generally designated as 10 in FIGS. 3A and 3B: a base portion 12 and a back portion 14; the base portion comprising an upper surface 16, the upper surface 16 having opposing front and rear edges (18,20) and side edges (22,24) extending therebetween; a Seat Reference Point (SRP) on the upper surface 16 of the base portion 12 being disposed equally spaced from the side edges (22,24) thereof and at an area of intersection of the back portion 14 and the upper surface 16.

Figure 3A:
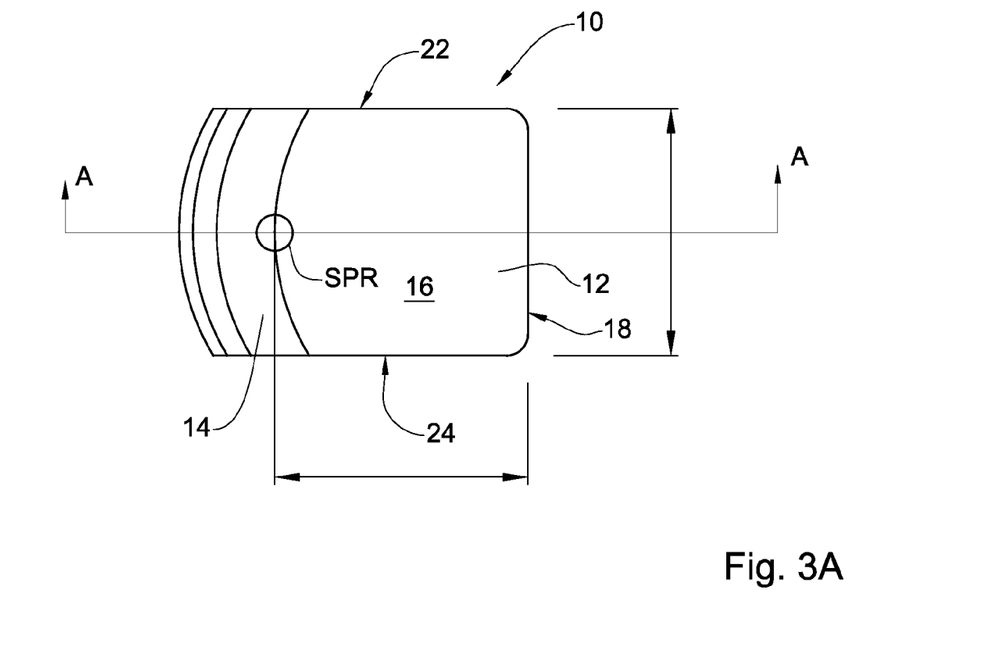
FIG. 3A is a schematic top view of a seat from FIG. 44 of MIL-STD 1472F with additional reference numerals added thereto.
Figure 3B:
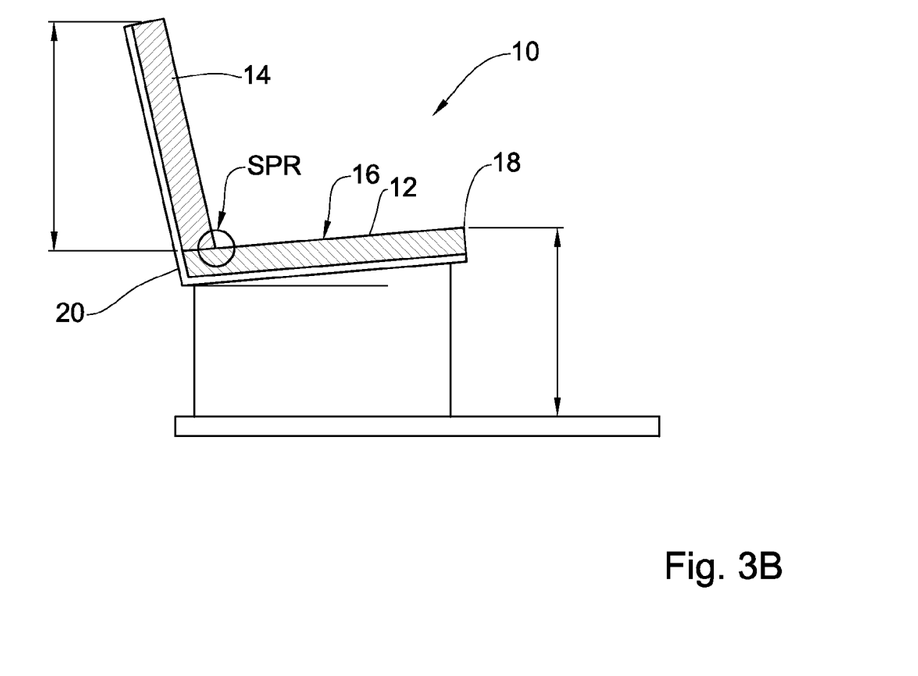
FIG. 3B is a schematic sectional side view of the seat in FIG. 3A, also from FIG. 44 of MIL-STD 1472F with additional reference numerals added thereto.

As will be understood, an SRP in the present application refers to a position of a part of a seat in a driver's compartment, and corresponds in meaning to that shown in FIG. 44 of MIL-STD-1472F, upon which FIGS. 3A and 3B are based.

Additionally, reference in the present application will be made to a Seat Pan Height Reference Point (SPHRP), which is a term that does not appear in MIL-STD-1472F, but is defined, with reference to FIGS. 3A and 3B, as a point disposed on the front edge 18 of the upper surface 16 of the base portion 12, the SPHRP being equally spaced from the side edges (22, 24).

In accordance with a first aspect of the subject matter of the present application, there is provided a method of designing a driver's compartment for accommodating a predetermined range of driver's sizes comprising a smallest size and a largest size, the compartment having a floor and a top end, the method including:

a. designing a driver's seat having a seat reference point (SRP) used to define a position of a corresponding part of the seat in the compartment and a seat pan height reference point (SPHRP) used to define a position of the front portion of the seat in the compartment;

b. providing a seat moving mechanism configured to move at least the SRP vertically in the compartment between a first position in which the SRP is disposed at a first vertical distance H1 from the top end and the SPHRP is disposed at a vertical distance of at least H3 from the floor, and in which the seat is configured to accommodate a driver of the smallest size, and a second position in which the SRP is disposed at a second vertical distance H2 from the top end, and the SPHRP is disposed at a vertical distance of at least H3 from the floor, H2 being greater than H1 and in which the seat is configured to accommodate a driver of the largest size;

c. disposing the top end at a vertical distance H4 from the floor, the distance H4 corresponds to the sum of H1 and H3, so that the vertical distance H4 of the top end suits for accommodating the driver of the largest size is the seat only in the second portion.

The method above can enable a driver's compartment to be smaller than would be the case in the comparative examples shown in FIGS. 1 and 2, where the driver of the largest size is seen to sit at a height greater than a driver of a smaller size. An advantage of the method can be that a design of the driver's compartment can suit a range of sizes of drivers, by designing a seating position of a larger driver to be lower position than a smaller driver, which is larger than a range of sizes enabled with conventional seating positions, i.e. with the larger driver being seated higher up.

The method can further include limiting a vertical dimension of at least front window area of the compartment to suit the vision cone of the largest size driver in the second position. It will be appreciated that in some vehicles the material thereof having the highest areal density is the transparent material constituted by the vehicle's glass and/or transparent armor (for military vehicles). An advantage of reducing the window area of a driver's compartment can improve the mobility of the vehicle. According to one design, such method can allow a 100 mm change in height between the SRP of the largest and smallest driver to achieve a reduction of approximately 14% per meter squared of transparent material in a driver's compartment.

The method can further include designing the driver's seat to be movable by the seat moving mechanism into a number of additional positions between the first and second positions, the vertical distance of the SRP from the top end in the additional positions gradually increasing in the direction towards the second position.

a. designing the seat moving mechanism to maintain a vertical distance of the SPHRP from the floor at a constant height or a height gradually decreasing in the direction towards the second position; and b. designing the seat moving mechanism into a number of additional positions between the first and second positions, the vertical distance of the SRP from the top end in the additional positions gradually increasing in the direction towards the second position; a rate of increase of the vertical distance of the SRP from the top end in the additional positions in the direction towards the second position being greater than a rate of decrease of the vertical distance of the SPHRP from the floor in the additional positions in the direction towards the second position.

The method can further include configuring a front edge of a base portion to move only along a horizontal plane. The method can further include configuring an SPHRP to move only along a horizontal plane. An advantage of reducing the vertical dimension of the roof of a driver's compartment can improve the mobility of the vehicle.

Another advantage can be that such reduction can allow a more compact driver's compartment design than would otherwise be achievable in a military vehicle produced in accordance with the recommended clearances of Table XX of MIL-STD-1472F, shown below.

TABLE XX

Recommended clearances around equipment operator's station to accommodate the 95th percentile soldier dressed in Arctic clothing. Operator seat in rear most position (FIG. 45)

| | |
|---|---|
| A. Elbow (dynamic) | 91 cm (36 in) |
| B. Elbow (static) | 71 cm (28 in) |
| C. Shoulder | 58 cm (23 in) |
| D. Knee width (minimum) | 46 cm (18 in) |
| E. Knee width (optimum) | 61 cm (24 in) |
| F. Boot (provide adequate clearance to operate brake pedal without inadvertent acceleration operation) | 15 cm (6 in) |
| G. Pedals (minimum) | 5 cm (2 in) |
| H. Boot (provide adequate clearance to operate accelerator without interference by brake pedal) | 15 cm (6 in) |
| 1. Head (seat reference point (SRP) to roof line) | 107 cm (42 in) |
| 2. Abdominal (seat back to steering wheel) | 41 cm (16 in) |
| 3. Front of knee (seat back to manual controls on dash) | 74 cm (29 in) |
| 4. Seat depth (seat reference point to front edge of seat pan) | 41 cm (16 in) |
| 5. Thigh (under side of steering wheel to seat pan) | 24 cm (9.5 in) |
| 6. Seat pan height | 38 cm (15 in) |
| 7. Boot (front of seat pan to heel point of accelerator) | 36 cm (14 in) |
| 8. Minimum mitten clearance around steering wheel | 8 cm (3 in) |
| 9. Knee-leg-thigh (brake/clutch pedals to lower edge of steering wheel) | 66 cm (26 in) |

The method can include designing the driver's compartment to comply with any combination of the recommended clearances in the table above.

The top end, such as the compartment's ceiling can be limited in accordance with a specific ratio of the SRP. According to one example the method can include limiting a ratio of a vertical distance from the SRP to the floor and H2 in the second position, to not exceed 330:1070. In such case the method can also include limiting a vertical dimension of the top end to suit the vertical distance of the SRP from the floor and a vertical distance from the SRP to the top end H1, in the first position of the smallest size driver, to not exceed 347:1053. According to another example, the method can further include limiting a ratio of a vertical distance from the SRP to the floor and H2 in the second position, to not exceed 290:1070. In such case the method can also include limiting a vertical dimension of the top end to suit the vertical distance of the SRP from the floor and a vertical distance from the SRP to the top end H1, in the first position of the smallest size driver, to not exceed 347:1053. According to yet a further example, the method can including limiting a ratio of a vertical distance from the SRP to the floor and H2 in the second position, to between 280:1070 and 290:1070. According to another example, the method can include limiting a ratio of a vertical distance from the SRP to the floor and H2 in the second position, to not exceed 280:1020. In such case the method can also include limiting a vertical dimension of the top end to suit the vertical distance of the SRP from the floor and a vertical distance from the SRP to the top end H1, in the first position of the smallest size driver, to not exceed 347:953.

The method can further include limiting a ratio of the horizontal motion to vertical motion of the SRP to 2.8:1.

The method can further include designing the driver's compartment to be protected by armor.

In accordance with another aspect of the subject matter of the present application, there is provided a vehicle comprising a driver's compartment having a front window area, a driver's seat and a seat moving mechanism; the driver's seat having a seat reference point (SRP) used to define a position of a corresponding part of the seat in the compartment; the seat moving mechanism being configured to move the driver's seat into a number of positions, each different position including the SRP at a different horizontal distance from the front window area and a different vertical distance from the floor, each position having a horizontal distance the front window area which is greater than a different position having a vertical distance of the SRP from the floor smaller then the different position.

Such seat moving mechanism can have the advantage of overcoming a natural tendency of a driver to elevate the driver's seat to a maximum height in order to gain better vision.

The vehicle can further comprise a seat pan height reference point (SPHRP) used to define a position of a corresponding part of the seat in the compartment, the seat moving mechanism being configured to maintain a vertical distance of the SPHRP from the floor at a constant height.

The seat moving mechanism can be configured to move the SRP at a ratio of horizontal distance to vertical distance of 1:2.8.

The vehicle, driver's compartment, and driver's seat of the present aspect can have any combination of features described above in connection with the first aspect.

The vehicle can be an armored vehicle.

In accordance with either of the aspects above, the driver's compartment can be designed to be compliant with MIL-STD-1472F. Accordingly:

a vertical distance from the SRP to the roof in the second position, i.e. a position designed for a largest driver size in the range, can be 1400 mm or less (item no. 1 of Table XX, the recommended clearance for the head);

the largest size in the predetermined range of driver's sizes can be a $95^{th}$ percentile soldier, compliant with section 5.12.1 and Table XX of MIL-STD-1472F.

the smallest size in the predetermined range of driver's sizes can be a $5^{th}$ percentile soldier compliant with section 5.12.1 of MIL-STD-1472F.

It will be understood that the specific examples given with respect to MIL-STD-1472F are for understanding of the various embodiments of the present invention. Therefore, should this standard be replaced in future with a subsequent updated standard having modified recommended clearances, the SRP, vertical distance from the SRP to the ceiling in the second position, largest size and smallest sizes in the predetermined range of driver's sizes can be designed in accordance with the updated standard, without departing from the subject matter of the present application.

BRIEF DESCRIPTION OF THE DRAWINGS

In order to understand the subject matter of the present application and to see how it can be carried out in practice, embodiments will now be described, by way of non-limiting example only, with reference to the accompanying drawings, in which.

DETAILED DESCRIPTION

Figure 4:
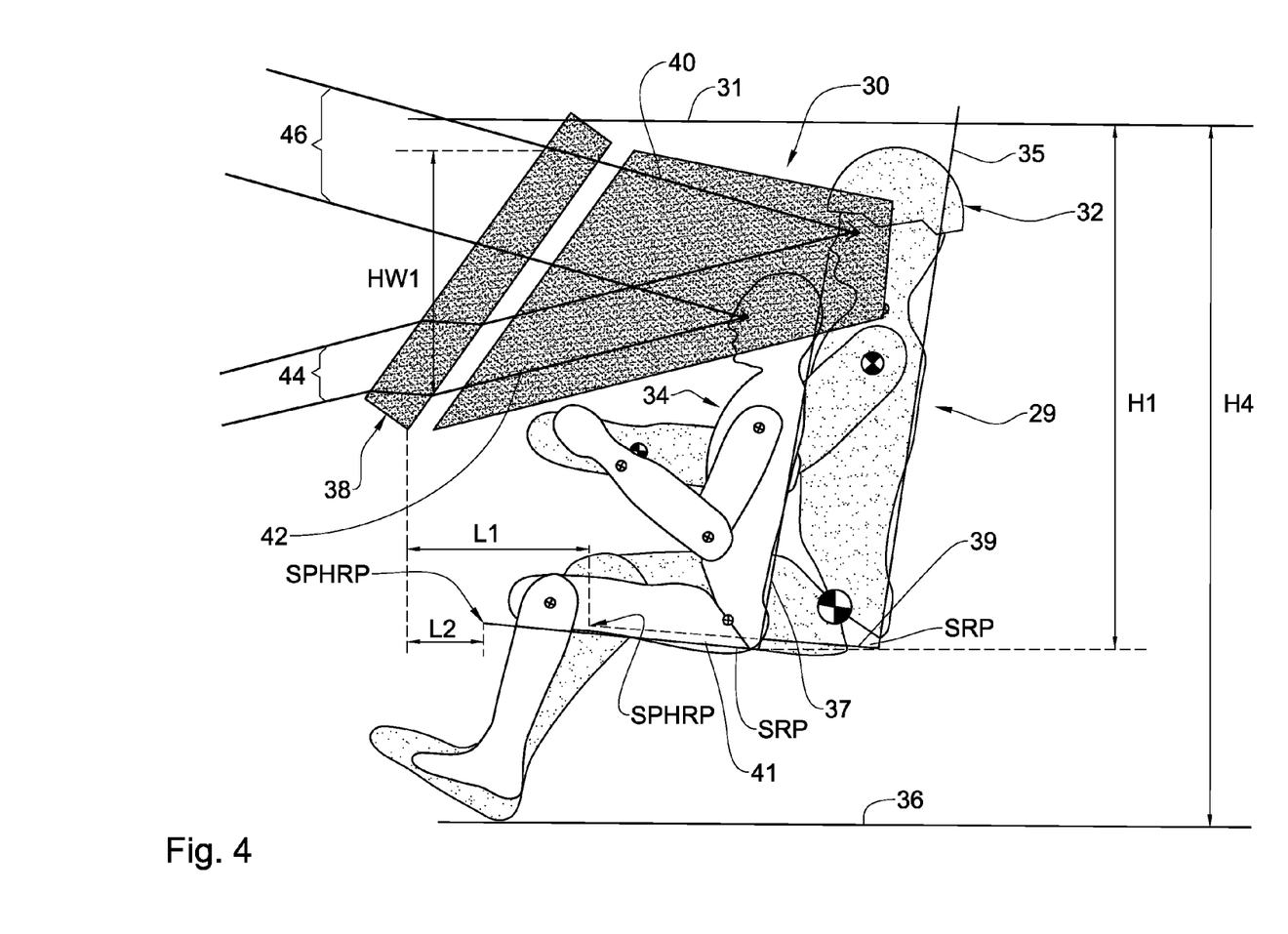
FIG. 4 is a schematic side view of a driver's compartment designed to accommodate drivers of two different sizes.

Referring now to the drawings wherein like reference characters designate like or corresponding parts throughout several views, there is shown in FIG. 4 a driver's compartment generally designated as 30.

The driver's compartment 30 comprises a top end, such as a ceiling 31 and a compartment floor 36. The compartment 30 is designed to accommodate a larger driver 32 and a smaller driver 34 while being seated on a vehicle seat, generally designated 29. It will be understood that in reality each driver is seated on a driver's seat 29 as defined above, however for the purposes of explanation, in the present view, the seat is shown in two different positions, a large driver position and a small driver position, with schematic lines 35, and 37 representing a back portion of a seat in the large driver position, and in the small driver position, respectively. Similarly, SRP, SPHRP and imaginary lines 39 and 41 joining same are shown for both positions. The SRP for both positions is at approximately the same vertical distance (H1) from the ceiling 31 of the driver's compartment 30. In order to accommodate the two drivers, the SPHRP of the large driver position and the SPHRP of the small driver position are at different horizontal distances L1 and L2 from a front window area 38 of the driver's compartment 30. The different horizontal distances L1 and L2, are approximately 200 mm apart.

As a result of the different sizes of the small and large driver, the height of the compartment H4, must be designed to accommodate the seat with the larger driver 32 seated thereon, which is the sum of the height of the SPR and vertical distance H1 from the ceiling. Thus, in order to accommodate large drivers a larger compartment is required, which in a case of an armored vehicle requires additional surface area to be protected.

In addition, as a result of their different sizes, each of the two drivers 32 and 34 have a vision cone (40, 42) which only partially overlaps the others vision cone. Areas of the vision cones which do not overlap are designated as 44 and 46. As can be seen, the front window area of the driver's compartment is designed to have a vertical height HW1 suited to accommodate both vision cones. Thus, the front window area is substantially large, which in the case of an armored vehicle requires additional window surface to be protected.

Figure 5A:
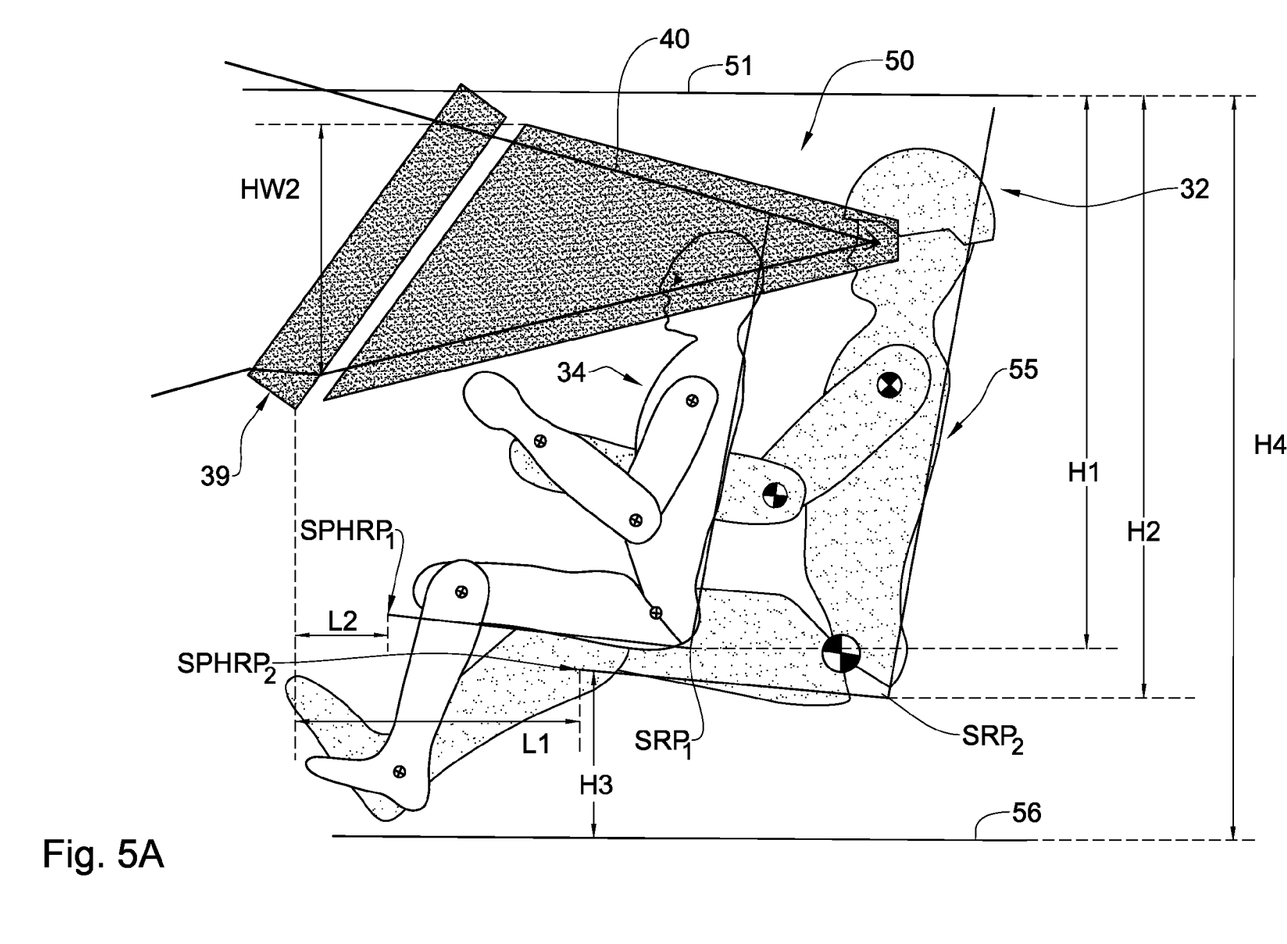
FIG. 5A is a schematic side view of a driver's compartment designed in accordance with the subject matter of the present application.

Referring now to FIG. 5A, there is shown a driver's compartment 50 having a top end, such as a ceiling 51, and a compartment floor 56. The compartment 50 is designed to accommodate a larger driver 32 and a smaller driver 34, while being seated on seat 55. It can be seen that in the first position the driver's compartment 50, can accommodate a small driver 34 while being seated on seat 55, with the $SPR_1$ being at a vertical distance H1 from the ceiling 51.

In the second position, the driver's compartment 50, can accommodate a large driver 34 by moving seat 55 to the second position in which $SRP_2$ of the seat 55 is lowered thereby increasing the vertical distance H2 between the $SRP_2$ and the ceiling 51. It is appreciated that the seat 55 can alternate between the first and the second position while maintaining the same horizontal distances (L1, L2), from a front window area 39.

As a result of this design, the height of the compartment H4 can be smaller than the height of the compartment 30 of FIG. 4. This is due to the fact that $SPR_2$ in the large driver position is lower than the $SPR_1'$ in the small driver position, thus compensating for the difference between the vertical distance H2 required in the large driver position and the vertical distance H1 required in the small driver position. This allows minimizing the overall size of the compartment, thereby reducing the amount of surface area to be protected.

Figure 5B:
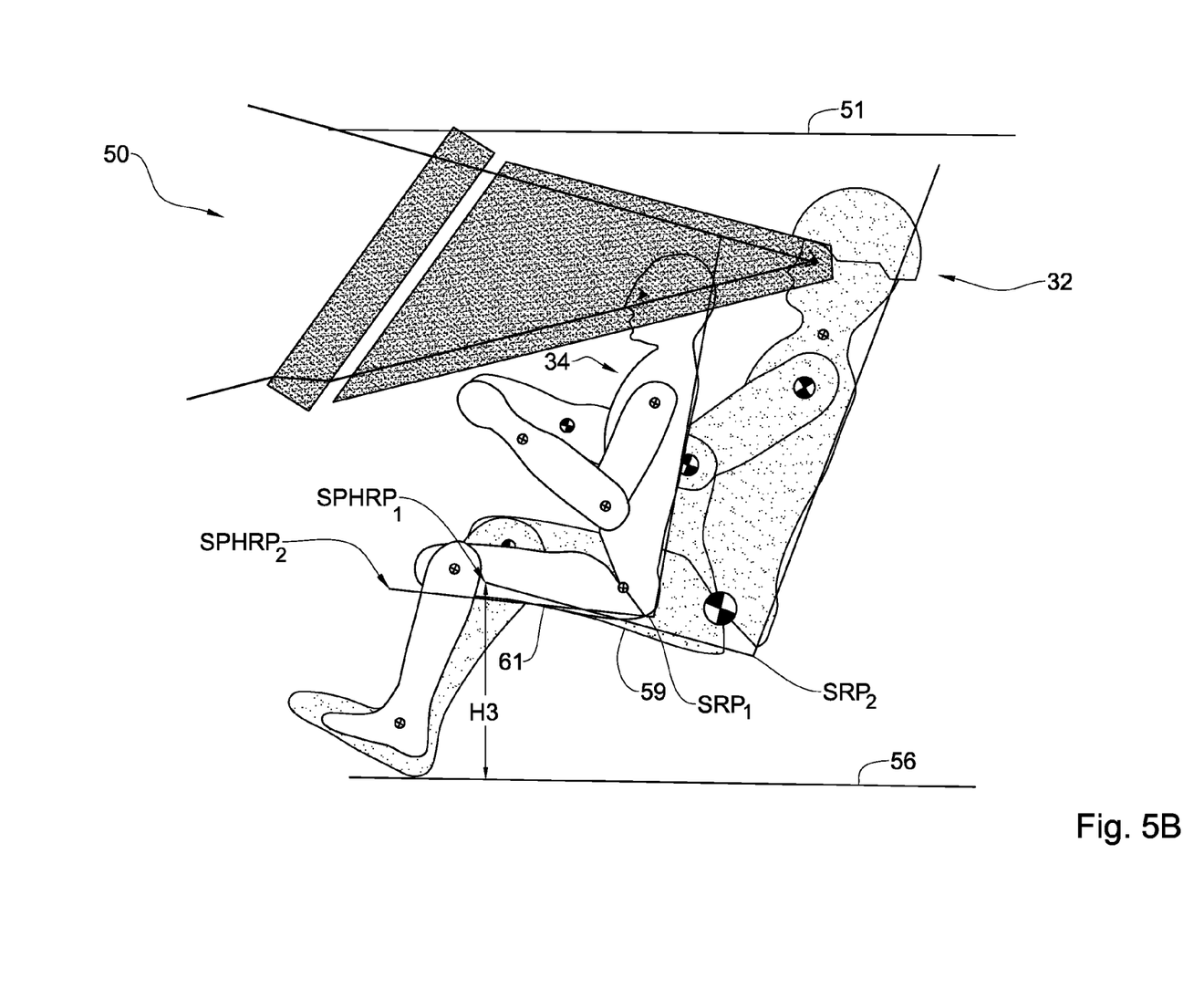
FIG. 5B is a schematic side view of the driver's compartment in FIG. 5A, with a modified driver's position.

In addition, as can be seen in FIG. 5A, the vision cone 40 of the larger driver 32 in this design encompasses a vision cone (not seen) of the smaller driver 34. Thus, the front window area of the driver's compartment is designed to have a vertical height HW2, which is suited to accommodate both vision cones. The magnitude of HW2 is smaller than the magnitude of HW1 of FIG. 4. This design allows for a smaller surface area to be protected, and for providing a smaller protected window surface. Turning now to FIG. 5B, it can be seen that the SPHRP of both positions can be maintained at a common vertical height from the floor 56, and the seat can be adjusted merely by reducing the height of the SRP of the larger driver, while maintaining the same horizontal distances (L1, L2), from a front window area 39. Thus, a gradient of the imaginary line 59 between the $SPHRP_2$ and the $SRP_2$ of the seat position accommodating the larger driver 32 will have a larger magnitude than the imaginary line 61 between the $SPHRP_1$ and the $SRP_1$ of the seat position accommodating the smaller driver 34. It is appreciated that maintaining the SPHRP in a fix vertical position for example at height H3 from the floor 56, allows for further minimizing the size of the compartment 50. This is due to the fact that SPHRP according to some standard must be at a minimal height form the floor, for example, 380 mm, either for a small driver or for a large driver. Thus, providing a seat moving mechanism which is configured to move SRP in the compartment between the two vertical distances from the ceiling, while maintaining the SPHRP in a vertical distance of at least H3 from the floor, allows for a small driver and a large driver to be accommodated in the compartment 50, while meeting the requirement of the vehicle seat standard. However, according to another example, the seat moving mechanism can be configured to allow vertically moving SPHRP so long as a minimum vertical height of H3 is maintained.

According to a further example, the seat in the compartment can be provided with a seat moving mechanism for vertically moving the SRP and SPHRP, as described hereinabove, while also allowing horizontally moving the seat. For ease of understanding of the vertical and horizontal movement of the SRP and SPHRP along a desired path, attention is directed to FIG. 6.

Figure 6:
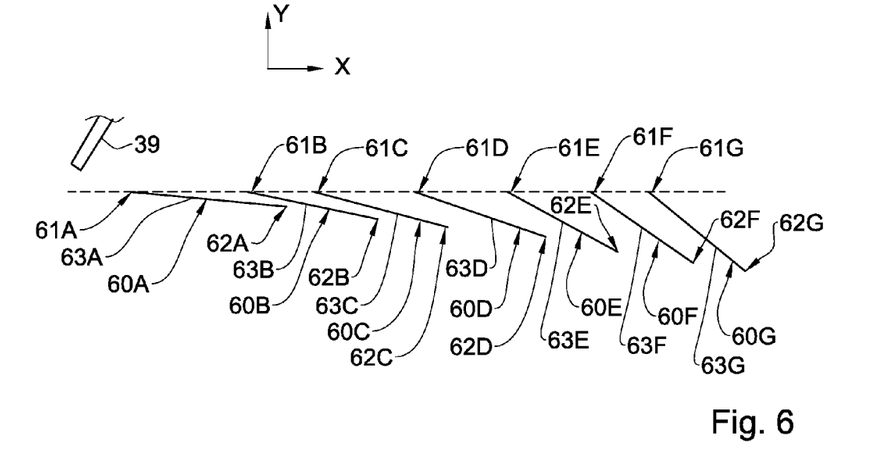
FIG. 6 is a schematic representation of a side view of an SRP, SPHRP, and imaginary line connecting same, of a driver's seat in accordance with the subject matter of the present application, in different positions, the positions being spaced from each other for ease of explanation.

In FIG. 6 a first position, generally designated as 60A closest to a front window area of a driver's compartment (not shown) showing an SPHRP, designated as 61A, an SRP, designated as 62A, and an imaginary line joining same, designated as 63A.

A second position is shown generally designated as 60B, with the elements thereof having numerals corresponding to the numerals of the first position with the addition of the designation character "B". Similarly third, fourth, fifth, sixth and seventh positions are shown. The final position is designated by the character G, which is the position of greatest horizontal distance from the front window area 39.

Using X and Y coordinates, positions in millimeters, and assuming the following conditions: the SPHRP 61A of the first position 60A starts at position (0,380), each position is moved 33 mm in a horizontal direction away from the front window area, the internal height of the compartment is 1350 mm, and the length of the seat depth is 410 mm (item no. 4 in Table 1 above). Although the vertical positions of SPR and the SPHRP hereinabove were referred to with respect to the vertical distance from the ceiling, for the sake of clarity, the X coordinates here, are calculated as the vertical distance of SPR and the SPHRP with respect to the floor of the compartment. An example set of coordinates of the SPHRP and SRP for each position shown can be as follows:

| position | Position designation suffix | SPHRP x | y | SRP x | y |
|---|---|---|---|---|---|
| 1 | A | 0 | 380 | 408.44 | 344.27 |
| 2 | B | 33 | 380 | 407.36 | 333.59 |
| 3 | C | 66 | 380 | 406.01 | 322.94 |
| 4 | D | 99 | 380 | 404.38 | 312.33 |
| 5 | E | 132 | 380 | 402.47 | 301.77 |
| 6 | F | 165 | 380 | 400.28 | 291.26 |
| 7 | G | 198 | 380 | 397.82 | 280.81 |

It will be understood that the horizontal spacing between the positions in FIG. 6 is exaggerated in the drawing to allow understanding of the pivoting motion.

Figure 7:
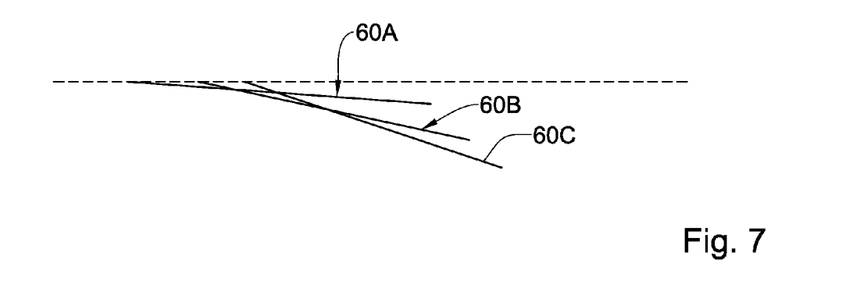
FIG. 7 is a schematic representation of some of the positions of the SRP, SPHRP, and imaginary line in FIG. 6.

A more accurate rendering of the horizontal spacing can be seen in FIG. 7 where the first, second and third positions (60A, 60B, 60C) are shown to demonstrate horizontal motion of the SRP and SPHRP.

Figure 8:
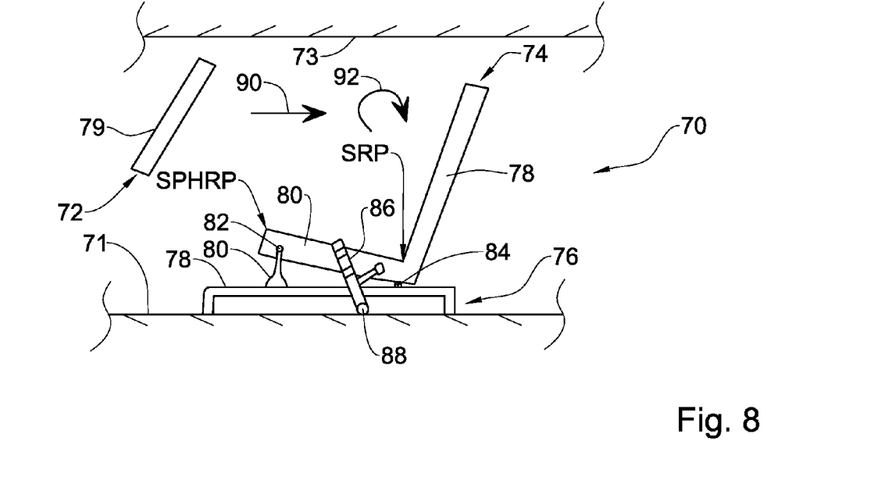
FIG. 8 is a schematic side view of an example driver's seat.

Shown in FIG. 8 is a driver's compartment, generally designated as 70, of an armored vehicle (not shown). The driver's compartment 70 comprises a floor 71, a roof, 73, a front window area 72 comprising a window 79 made of transparent armor, a driver's seat 74 and a seat moving mechanism generally designated as 76.

The driver's seat comprising a back portion 78, base portion 80, and having a seat reference point (SRP) used to define a position of a corresponding part of the seat in the compartment, and a seat pan height reference point (SPHRP).

The seat moving mechanism 76 comprising rails 78, front legs 80 configured to slide along the rails 78 and pivotally attached to a front point 82 of the base portion 80, compressible springs 84 configured to slide along the rails 78, and a lever mechanism 86 pivotally attached at point 88 to the floor 71. The lever mechanism 86 further comprising a locking mechanism (not shown) for locking the lever mechanism 86 in a desired position, or releasing it from that position.

In operation, when the locking mechanism 86 is not in a locked state, a user can slide the seat 74 in a horizontal direction, designated by arrow 90, away from the front window area 72, along the rails 78. During this motion, the lever mechanism 86 pivots at the floor 71, causing the seat 74 to pivot in the direction of arrow 92, about front point 82, compressing springs 84 toward the floor 71, and moving the SRP away from the ceiling 73. The user can then lock the seat 74 at the desired orientation, with the SRP of the seat consequently being at a vertical distance from the ceiling 73 larger than is the case when the seat is closer to the front window area 72. In this position, compartment 70 can accommodate a larger driver. As will be understood, the seat 74 can be moved in a direction opposite to arrow 90, in which case the seat will translate horizontally towards the front window area and pivot about front point 82 in a direction opposite to arrow 92, thereby moving the SPR toward the ceiling and allowing a small driver to be seated on seat 74, while maintaining the required vision cone. In any event, in both positions the SPHRP is not displaced toward the floor 71, below a predetermined vertical distance, for example 380 mm.

Such seat can be used in a driver's compartment to achieve the positions described above. However, it will be understood that a seat design for carrying out the desired positioning described above can be carried out in numerous ways.

The invention claimed is:

1. A method of designing a driver's compartment for accommodating a predetermined range of driver's sizes comprising a smallest size and a largest size, the compartment having a floor and a top end, the method including:
   a. designing a driver's seat having a seat reference point (SRP) used to define a position of a corresponding part of the seat in the compartment and a seat pan height reference point (SPHRP) used to define a position of the front portion of the seat in the compartment;
   b. providing a seat moving mechanism configured to move at least the SRP vertically in the compartment between a first position in which the SRP is disposed at a first vertical distance H1 from the top end and the SPHRP is disposed at a vertical distance of H3 from the floor, and in which the seat is configured to accommodate a driver of the smallest size, and a second position in which the SRP is disposed at a second vertical distance H2 from the top end, and the SPHRP is disposed at another vertical distance of at most H3 or less from the floor, H2 being greater than H1 and in which the seat is configured to accommodate a driver of the largest size;
   c. disposing the top end at a vertical distance H4 from the floor, the distance H4 corresponds to the sum of H1 and H3, so that the vertical distance H4 of the top end is suitable for accommodating the driver of the largest size only when the seat is in the second position; and
   d. designing the seat moving mechanism to maintain, in the first and second positions, a vertical distance of the SPHRP from the floor at a substantially constant height.

2. The method of claim 1, further comprising limiting a vertical dimension of at least front window area of the compartment to suit a vision cone of the driver of the largest size in the second position.

3. The method of claim 1, further comprising designing the driver's seat to be movable by the seat moving mechanism into a number of additional positions between the first and second positions, the vertical distance of the SRP from the top end in the additional positions gradually increasing in the direction towards the second position.

4. The method of claim 1, further comprising:
a. designing the seat moving mechanism into a number of additional positions between the first and second positions, the vertical distance of the SRP from the top end in the additional positions gradually increasing in the direction towards the second position; a rate of increase of the vertical distance of the SRP from the top end in the additional positions in the direction towards the second position being greater than a rate of decrease of the vertical distance of the SPHRP from the floor in the additional positions in the direction towards the second position.

5. The method of claim 1, further comprising configuring the driver's seat for horizontal motion including forward motion in a direction towards a front window area of the compartment of the vehicle and rearward motion in a direction opposite thereto.

6. The method of claim 5, further comprising limiting a ratio of the horizontal motion to vertical motion of the SRP to 2.8:1.

7. The method of any one of claim 1, further including configuring the SPHRP to move only along a horizontal plane.

8. The method of claim 1, further comprising limiting a ratio of a vertical distance from the SRP to the floor and H2 in the second position, to not exceed 330:1070.

9. The method of claim 8, further comprising limiting the vertical distance H4 to suit the vertical distance of the SRP from the floor and the first vertical distance H1, in the first position, to not exceed 347:1053.

10. The method of claim 1, further comprising limiting a ratio of a vertical distance from the SRP to the floor and H2 in the second position, to not exceed 290:1070.

11. The method of claim 10, further comprising limiting the vertical distance H4 of the top end to suit the vertical distance of the SRP from the floor and the first vertical distance H1, in the first position, to not exceed 347:1053.

12. The method of claim 1, further comprising limiting a ratio of a vertical distance from the SRP to the floor and H2 in the second position, to between 280:1070 and 290:1070.

13. The method of claim 1, further comprising limiting a ratio of a vertical distance from the SRP to the floor and H2 in the second position, to not exceed 280:1020.

14. The method of claim 13, further comprising limiting the vertical distance H4 of the top end to suit the vertical distance of the SRP from the floor and the first vertical distance H1, in the first position, to not exceed 347:953.

15. The method of claim 1, further comprising designing the driver's compartment for an armored vehicle, such that an amount of surface area to be protected by armor is reduced.

16. The method of claim 1, wherein the top end is a ceiling of the driver's compartment.

17. A vehicle comprising a driver's compartment having a front window area, a driver's seat and a seat moving mechanism; the driver's seat having a seat reference point (SRP) used to define a position of a corresponding part of the seat in the compartment; the seat moving mechanism being configured to move the driver's seat into a number of positions, each different position including the SRP at a different horizontal distance from the front window area and a different vertical distance from the floor, each position having a horizontal distance the front window area which is greater than a different position having a vertical distance of the SRP from the floor smaller than the different position, wherein the seat moving mechanism is configured to move the SRP at a ratio of horizontal distance to vertical distance of 2.8:1.

18. The vehicle of claim 17, wherein the seat moving mechanism being configured to maintain the vertical distance H3 of the SPHRP from the floor at a constant height.

19. A method of designing a driver's compartment for accommodating a predetermined range of driver's sizes comprising a smallest size and a largest size, the compartment having a floor and a top end, the method including:
a. designing a driver's seat having a seat reference point (SRP) used to define a position of a corresponding part of the seat in the compartment and a seat pan height reference point (SPHRP) used to define a position of the front portion of the seat in the compartment;
b. providing a seat moving mechanism configured to move at least the SRP vertically in the compartment between a first position in which the SRP is disposed at a first vertical distance H1 from the top end and the SPHRP is disposed at a vertical distance of H3 from the floor, and in which the seat is configured to accommodate a driver of the smallest size, and a second position in which the SRP is disposed at a second vertical distance H2 from the top end, and the SPHRP is disposed at another vertical distance of at most H3 or less from the floor, H2 being greater than H1 and in which the seat is configured to accommodate a driver of the largest size;
c. disposing the top end at a vertical distance H4 from the floor, the distance H4 corresponds to the sum of H1 and H3, so that the vertical distance H4 of the top end is suitable for accommodating the driver of the largest size only when the seat is in the second position; and
d. limiting a vertical dimension of a front window of the driver's compartment such that a vision cone of the driver of the smallest size in the first position is encompassed by a vision cone of the driver of the largest size in the second position.

* * * * *